United States Patent [19]

Gulakov et al.

[11] 4,342,898
[45] Aug. 3, 1982

[54] METHOD OF SURFACING AND APPARATUS FOR CONTROLLING SAME

[76] Inventors: Sergei V. Gulakov, ulitsa M. Mazaya, 41, kv. 2; Boris I. Nosovsky, ulitsa Kuprina, 23-a, kv. 30; Leonid K. Leschinsky, prospekt Lenina, 75-b, kv. 60; Xenofont X. Stepnov, ulitsa Dalnevostochnaya, 50, kv. 4, all of Zhdanov Donetskoi oblasti; Petr I. Polukhin, ulitsa Dmitria Ulyanova, 3, kv. 137; Vladimir A. Nikolaev, ulitsa Lavochkina, 46, korpus 2, kv. 228, both of Moscow; Valery G. Bendrik, ulitsa Ilicha, 35, kv. 2; Eduard N. Shebanits, ulitsa Lavitskogo, 3, kv. 30, both of Zhdanov Donetskoi oblasti; Vladimir P. Polukhin, ulitsa Dmitria Ulyanova, 3, kv. 148, Moscow, all of U.S.S.R.

[21] Appl. No.: 183,728

[22] Filed: Sep. 3, 1980

[51] Int. Cl.$^3$ .............................................. B23K 9/04
[52] U.S. Cl. ............................ 219/76.14; 219/137 R; 219/137.71
[58] Field of Search ............ 219/137 R, 137.71, 76.14

[56] References Cited

U.S. PATENT DOCUMENTS

| 3,274,371 | 9/1966 | Manz et al. | 219/76.14 |
| 3,509,314 | 4/1970 | Freytag | 219/137.71 |
| 4,307,281 | 12/1981 | Ivannikov et al. | 219/137 R |

*Primary Examiner*—C. C. Shaw
*Attorney, Agent, or Firm*—Fleit & Jacobson

[57] ABSTRACT

A surfacing method comprises feeding alloying material to the weld pool in between two consumable electrodes, with the distance between those electrodes being determined depending on the diameter of the electrodes, feed mass velocity of the alloying material and the total feed mass velocity of the electrodes. An apparatus for controlling the surfacing process according to the proposed method includes an electrode feed rate transducer connected to series-coupled converters, one of which converters determines the ratio of the amount of the alloying material to the total amount of metal being fed to the weld pool, and the other one determines the alloying degree of the surface layer being formed. The converters are connected to an adder unit connected to a device for delivering additional alloying material whereas the converter for determining the alloying degree includes a programmer device and is connected with the device for feeding the alloying material.

4 Claims, 5 Drawing Figures

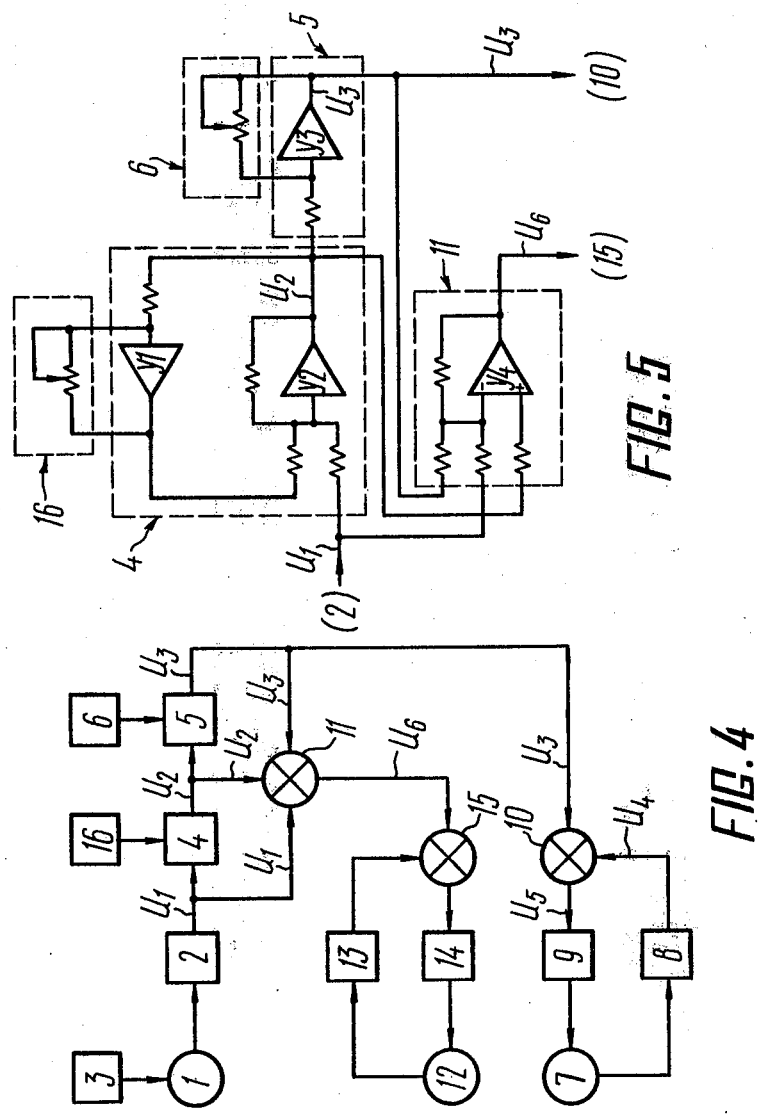

METHOD OF SURFACING AND APPARATUS FOR CONTROLLING SAME

BACKGROUND OF THE INVENTION

1. Field of the Invention

The present invention relates to welding practice, and more specifically to a method of surfacing to form a surface layer having different-composed portions, and an apparatus for controlling the same. The invention can be used for surfacing any articles with the formation of a surface layer having certain portions of predetermined composition, for instance, for surfacing rollers to form a surface layer thereon consisting of portions having different composition and, hence, different properties.

2. Prior Art

Known in the art is a method of surfacing to form a surface layer with different-composed portions (cf. USSR Author's Certificate No. 507428) wherein electrode material and filler material, both in the form of two or more rods, are fed to the weld pool in a predetermined order and with a varying speed.

However, the above method has a limited application which is accounted for by limited possibilities in alloying the filler wire due to difficulties associated with drawing difficult-to-deform alloyed wire, and especially in the case of filler wire alloyed with elements raising hardness and lowering plasticity thereof, such as, for instance, carbon.

The degree of alloying of surfacing metal and possibilities of varying the composition and, hence, the properties thereof in the course of surfacing by the prior art method can be considerably enhanced by varying the feed mass velocity ($V_m$) of filler materials. In this case, however, a part of the heat generated by the arc is consumed to melt down the filler material, which affects the heat balance in the melt pool and, hence, the formation of the surface layer, and may be a cause of a lack of fusion with the basic material.

There is also known an apparatus for controlling the surfacing processes using at least two materials with the ratio of the amount of one material to the other one being maintained by varying their feeding rate or consumption (cf. U.S. Pat. No. 3,931,787). This apparatus has been disclosed in terms of its application for controlling the rate of feeding the flux onto a strip material. It comprises a strip material driving means, a strip material flow rate transducer, flux feeding means, and a feed rate transducer. It also includes a feed rate controlling means, an adder unit for stabilizing rate of feed, and signal converters.

The above apparatus is capable of maintaining only preset ratio of materials with a constant total quantity thereof. When the ratio of materials is changed, for instance, for the purpose of forming a layer having different-composed portions, the total quantity of the materials used also changes, which results in irregular depth of the surface layer being formed.

SUMMARY OF THE INVENTION

An object of the present invention consists in the provision of a surfacing method for building up a surface layer having portions with different composition, which method provides for improved control of chemical composition.

Another object of the invention is the provision of a surfacing method to form a surface layer having portions differing in their properties.

Still another object of the invention is the provision of an apparatus for controlling the surfacing process applying the proposed method to form a surface layer having different-composed portions.

These and other objects of the invention are attained in that in a method of surfacing to form a surface layer having portions of different composition, comprising the steps of feeding electrode material and filler material to the welding pool in a predetermined order, according to the invention the filler material is fed in between at least two consumable electrode spaced at a distance determined by the following relationship:

$$s = d\left(1 + k \frac{V_m}{\Sigma Ve + Vm}\right),$$

where
  $s$ = distance between the electrodes;
  $d$ = diameter of the electrode;
  $k$ = proportionality factor;
  $V_m$ = filler feed mass velocity;
  $\Sigma Ve$ = total feed mass velocity of the electrodes.

According to the invention varying the relationship between the feed mass velocity of the filler material and the total feed mass velocity of the electrode material depending on the change of the distance between the electrodes permits the range of composition variation to be increased. Improved control of composition is also provided by varying the distance between at least two electrodes, which enables maintaining thermal balance in the weld pool at the level ensuring intensive melting of materials fed to the weld pool.

The invention also resides in the provision of an apparatus for controlling surfacing process, comprising an electrode feeding device and a filler feeding device, each said device having a feed rate transducer, a means for controlling the said rate of feed, and an adder unit for stabilizing the rate of feed of the filler materials, and signal converters, wherein according to the invention the electrode feed rate transducer is connected with series-coupled signal converters, one of which signal converters is adapted for determining the ratio of the amount of filler material to the total quantity of materials being fed to the weld pool, while the other one is adapted for determining the degree of alloying of the metal being deposited, said converters having their outputs connected to the adder unit coupled to a device for feeding additional filler material, and the signal converter for determining the degree of alloying of the metal being deposited includes a programmer unit and is connected with the device for feeding filler material.

The signal converter for determining the ratio of the amount of filler material to the total quantity of all the materials being fed to the weld pool may be connected with an additional programmer unit.

BRIEF DESCRIPTION OF THE DRAWINGS

The invention will now be explained in greater detail with reference to embodiments thereof which are represented in the accompanying drawings, wherein:

FIG. 4 is a functional block diagram of the apparatus of the invention;

FIG. 5 is an electric connection scheme of a portion of the proposed apparatus.

PREFERRED EMBODIMENT OF THE INVENTION

The proposed method of the invention is embodied as follows. Surfacing is effected with the use of electrodes 1 and 2 applying submerged arc surfacing (see FIGS. 1, 2). Alloying degree is varied by varying the amount of alloying filler fed to the weld pool with simultaneously altering the distance between the electrodes.

Figure 3:
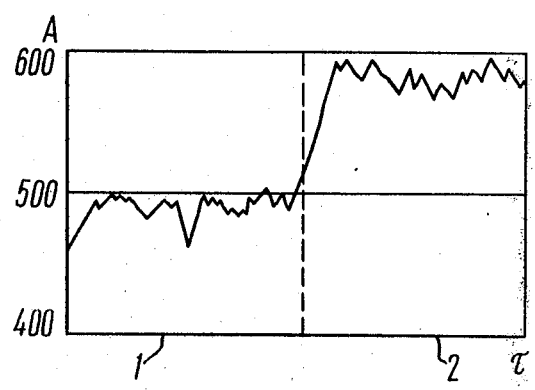
FIG. 3 is a graph representing welding current variation with the introduction of alloying materials into the weld pool.

Feeding alloying metal material to the weld pool causes the welding current to increase as a results of its being shunted by the alloying metal material (FIG. 3). With the increase of the distance s between the electrodes 1 and 2 (FIG. 1) and of the welding current, the convection current in the weld pool gets more intensive. As a result, the temperature in the weld pool gets more uniform across the whole volume thereof and melting of materials fed to the weld pool intensifies, thereby providing for a normal assimilation of these materials within the weld pool, higher degree of alloying, proper formation of the surface layer and a reliable fusion of these materials with the basic metal.

Figure 1:
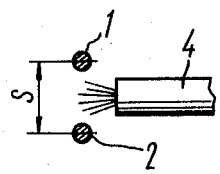
FIG. 1 is a diagram of surfacing with the use of two consumable electrodes shown in a horizontal plane.
Figure 2:
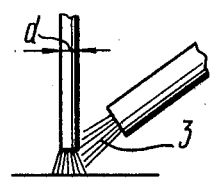
FIG. 2 is the same as in FIG. 1, with the electrodes shown in a vertical plane.

The ratio of the material feed mass velocity to the distance between the electrodes will be $$s = d\left(1 + k\frac{V_m}{\Sigma V_e + V_m}\right)$$

where
- s is a distance between the electrodes (ref. FIG. 1);
- d is a diameter of the electrodes;
- k 3 ... 7 is proportionality factor;
- $V_m$ is a feed mass velocity of the material;
- $\Sigma V_e$ is a total feed mass velocity of the electrodes.

Limit values of the factor k is selected on the basis of experimentally obtained results. Decreasing this factor below 3 causes destortion of the heat balance in the weld pool when the filler material is fed thereto, thereby impairing conditions for the formation of the surface layer (ref. FIG. 4). Increasing this factor to exceed 7 causes formation of two weld pools, thereby affecting the process of surface layer building-up.

EXAMPLE

Surfacing was done with the use of two electrodes each being 5 mm in dia. Total feeding speed of the electrodes constituted 64 m per hour. Surfacing arc current was 620-670 A and 32-34 V. The amount of the metal filler fed to the weld pool was varied, in the course of surfacing, so that the ratio $V_m/(\Sigma V_e + V_m)$ varied in the range from 0.1 to 0.35. With the amount of metal filler varied within the above limits the distance between the electrodes was varied in the range from 7 to 13 mm. The surface layer thus produced met technical requirements.

Further advantage in controlling the chemical composition of the surface layer being formed by the proposed surfacing method can be obtained by using filler material of two different compositions, one filler material being a ballast filler having composition similar to that of the electrode and the other one being alloying filler having composition different from that of the electrodes. Varying the ratio of the feed mass velocity of alloying material to that of ballast material, and the total mass velocity depending on the change of the distance between the electrodes enables the composition control to be improved without involving additional energy and affecting normal running of the process.

An apparatus used for controlling surfacing process of the invention is described below.

Referring now to FIG. 1, this apparatus includes an electrode feeding device 1 connected to a speed transducer 2 and a device 3 for controlling the rate of feed of electrodes. Electromagnetic, photoelectric, tachometric speed transducers may be used for the purpose, whereas controlling the speed can be done by means of a potentiometer, autotransformer and the like. The transducer 2 is connected to a converter, 4 for determining the ratio of the amount of non-electrode materials to the total quantity of materials fed to the weld pool in a unit time. The converter 4 is connected with a converter 5 converting the input signal into a signal proportional to the feed mass velosity of alloying non-electrode filler material. Fed to the converter 5 is a signal from a programmer unit 6 presetting the degree of alloying of the surface layer being formed. The converter 4 is a device comprising an operational amplifier and an adding element (FIG. 5). The converter 5 is connected to the device adapted for feeding alloying non-electrode filler material and comprising a feeding mechanism 7, a quantity meter 8 adapted for measuring the amount of the filler material being fed to the weld pool and connected to a driving mechanism (not shown) for feeding alloying non-electrode filler material, the said quantity meter being similar to the speed transducer 2, a device 9 for regulating the quantity of material being fed, and an adder unit 10 adapted for comparing an input signal $U_3$ with a feedback signal $U_4$. The device 9 may be constructed in the form of a thyristor-fed drive a magnetic amplifier and other appropriate devices suitable for the purpose. An operational or differential amplifier, or diode comparator may be used as an adding element. The speed transducer 2 and the converters 4 and 5 have their outputs connected to an adder unit II adapted to prevent electrode feeding speed variations from influencing alloying of the surface layer being formed, and the quantity of metal deposit being built up in a unit time with the degree of alloying being changed as a result of regulating the feed rate of additional non-electrode filler material. In this case connected to the adder unit II is a device for feeding additional non-electrode filler material having chemical composition identical with that of the welding electrode. This device includes units 12, 13, 14 and 15 which are similar to the units 7, 8, 9 and 10 respectively, and wherein the unit 12 is a device for feeding additional non-electrode filler material, the unit 13 is a quantity metal for measuring the quantity of non-electrode filler material fed to the weld pool, the unit 14 is a device for regulating the quantity of the filler material being fed, and the unit 15 is an adder unit adapted for comparing an imput signal $U_6$ with a signal arriving from the quantity meter 13.

The converter 4 is connected with a programmer unit 16 which may be constructed as a controllable voltage divider put in the feedback circuit of the operational amplifier of the converter 4.

The proposed apparatus operates as follows. When the surfacing apparatus is started, to the converter 4 there is applied a signal $U_1$ proportional to the feed rate of the welding electrode (FIGS. 4 and 5), in response to which at the output of this converter there appears a signal $U_2$ proportional to the total feed mass velocity of the welding electrode and non-electrode filler materials, and being equal to $$U_2 = U_1 \cdot \frac{1}{1 - k_1} \qquad (1)$$

where $k_1$ is a coefficient characterizing the ratio of the amount of non-electrode filler materials to the total amount of both the filler and electrode materials fed in a unit time to the weld pool.

The signal $U_2$ is applied to the input of the converter 5, in response whereto a signal $U_3$ appears at the output of this converter, which signal is proportional to the feed mass velocity of the alloying non-electrode filler material, and being in the following relationship with $U_2$:

$$U_2 = k_2 \cdot U_3 \qquad (3)$$

where $k_2 < 1$ is a coefficient characterizing the degree of alloying of the metal being deposited.

The coefficient $k_2$ can be varied, thereby making it possible to control by the programmer unit 6 the degree of metal alloying. In this case the converter 5 is connected through its output with the device for delivering a non-electrode alloying filler material.

The amount of alloying material being delivered to the weld pool is proportional to the signal $U_3$ which is supplied to the input of the adder unit 10. Stabilizing the rate of feed of the non-electrode alloying filler is done by means of a transducer 8 connected to the device 7 and being capable of producting a signal $U_4$ proportional to the amount of the alloying filler being delivered, which signal is compared in the adder unit 10 with the signal $U_3$. In case the amount of the alloying filler does not correspond to the predetermined value, the adder unit 10 generates a signal $U_5$ which, being applied to the regulating device 9, causes the latter to change, through the device 7, the rate of feed of the filler.

In order to rule out the influence of variation in the electrode wire feed rate on the degree of alloying and the amount of metal being deposited in a unit time when the degree of alloying is changed, the circuit incorporates an adder unit II and a device for feeding additional filler material.

Signals $U_1$, $U_2$, $U_3$ from the outputs of the devices 2, 4 and 5 are applied to the inputs of the adder unit II, at the output of which there appears a signal $$U_6 = U_2 - (U_1 + U_3), \qquad (3)$$

which signal controls the device for feeding additional non-electrode filler material. This device operates like the device for delivering the alloying non-electrode filler material.

Change in the rate of feed of the non-electrode alloying filler, with the electrode feed rate remaining constant, will cause the signal $U_3$ to be altered, in response to which the signal $U_6$ at the output of the adder unit II will also alter so as to comply with the equation (3). As a result, the feed rate of the additional non-electrode filler will be changed so that $$U_3 + U_6 = \text{const. with } U_1 = \text{const.} \qquad (4)$$

Compliance with the equations (3) and (4) enables formation of a surface layer having different-composed portions. In this case changing the chemical composition in the course of surfacing influences neither the depth of the surface layer being built up nor its cross-section.

In surfacing articles having a complex configuration with depositing thereupon a surface layer of varying chemical composition there is a need of altering the rate of surfacing according to a preset programme, in which case varying the rate of surfacing should in no way influence the chemical composition of the resultant surface layer. This may take place in surfacing such articles as rollers of a pilger mill, wherein the working surface of the hemmering portion and that of the sizing one are normally formed to meet different requirements. The amount of metal deposited on different portions of such rollers also differs.

Controlling the rate of surfacing by varying the welding electrode feed rate is not advisable, as this will change the conditions of the surfacing process.

This can be advantageously achieved by incorporating in the above apparatus a programmer unit 16 connected to the converter 4. This programmer unit enables controlling the ratio of the amount of the non-electrode filler materials to the total amount of both the filler and electrode materials fed to the weld pool, i.e. coefficient $K_1$ in the equation (1), in which case varying the coefficient $K_1$ does not cause change in the degree of alloying of the surface layer being deposited with the signal of the programmer unit 6 being constant. This programmer unit may be a controllable voltage divider put in to the feed back circuit of the operational amplifier in the converter 4.

Varying the rate of surfacing by varying the feed rate of the filler material being delivered to the weld pool also enables controlling the rate of crystallization and cooling of the metal being deposited, which, in turn, makes it possible to control the structure and, hence, properties of the metal layer being built up.

While the invention has been described herein in terms of the preferred embodiments, various variations may be made therein without departing from the spirit and scope of the invention as defined in the claims.

What is claimed is:

1. A method of surfacing for building up a surface layer having different-composed portions, comprising the steps of forming the weld pool by melting at least two electrodes disposed in a predetermined spaced relationship relative each other, feeding electrode and filler materials in a predetermined order to the weld pool, with the distance between said electrodes being determined from the following equation $$s = d\left(1 + k \frac{V_m}{\Sigma V_e + V_m}\right),$$

where s=distance between said electrodes, d=diameter of said electrodes, k=proportionality factor being equal to from 3 to 7, $V_m$=feed mass velocity of the filler material, and $\Sigma V_e$=total feed mass velocity of delivery of the electrodes.

2. A method as claimed in claim 1, wherein the filler material is an alloying filler material and a ballast filler material having a composition similar to that of the electrodes.

3. An apparatus for controlling the surfacing process, comprising:
- means for feeding consumable electrodes, having an electrode feed rate transducer and a means for controlling said electrode feed rate;
- converter connected to said consumable electrode feed rate transducer and adapted for converting a signal from said transducer to a signal proportional to the total feed mass velocity of both the electrode and filler materials;
- programmer unit for regulating the ratio of the amount of the filler material to the total amount of both the filler and electrode materials fed to the weld pool, said programmer unit being connected to said converter;
- converter connected in series with said converter for converting the output signal of said consumable electrode feed rate transducer to a signal proportional to the total feed mass velocity of both the electrode and filler materials, and being adapted for converting the output signal of the latter to a signal proportional to the feed mass velocity of the filler material;
- adder unit connected to said electrode feed rate transducer and said converters, and adapted for algebraic summing the signal proportional to the electrode material feed rate, the signal proportional to the total feed mass velocity of both the electrode and the filler materials, and the signal proportional to the filler material feed mass velocity, which said signals are applied from said electrode feed rate transducer and said converters respectively;
- means for feeding filler material, including a filler material feed rate transducer, a device for regulating the rate of feed of said filler material and an adder unit connected to the output of said converter for converting the output signal of said converter, for converting the output signal of said consumable electrode feed rate transducer to a signal proportional to the total feed mass velocity of both the electrode and the filler, to a signal proportional to the filler feed mass velocity, for comparing the output signal of the latter with the signal of said additional filler feed rate transducer;
- means for feeding additional filler material, including an additional filler feed rate transducer, a device for controlling said additional filler feed rate, and an adder unit connected to the output of said adder unit adapted for algebraic summing of the signal proportional to the electrode material feed rate, the signal proportional to the total feed mass velocity of both the electrode and the filler, and the signal proportional to the filler material feed mass velocity for comparing the output signal of the latter with the signal of said additional filler feed rate transducer.

4. An apparatus as claimed in claim 3, further includes programmer device, connected with the converter for converting the output signal of the consumable electrode feed rate transducer to a signal proportional to the total mass velocity of both the electrode and the filler.

* * * * *